INVENTORS
Joseph G. Nield, Jr.
Richard W. Strachan
BY John E. Vandigriff
ATTORNEY United States Patent Office 3,408,540
Patented Oct. 29, 1968

3,408,540
CONTROL CIRCUIT
Joseph G. Nield, Jr., Central Falls, and Richard W. Strachan, Providence, R.I., assignors to Texas Instruments Incorporated, Dallas, Tex., a corporation of Delaware
Filed Oct. 24, 1965, Ser. No. 504,718
11 Claims. (Cl. 317—41)

ABSTRACT OF THE DISCLOSURE

A control circuit for monitoring simultaneously conditions, such as heat generation, at various locations of electrical apparatus, and upon the occurrence of a specific condition such as overheating, causing the electrical apparatus to be de-energized. The control circuit is failsafe even when one or more of the circuit sensors is shorted. Sensor-resistor circuits are employed to bias transistors into a conducting state, which in turn control the gate current to an SCR which when conducting, permits current flow through a relay controlling the energization of the electrical apparatus. The circuit is so arranged that upon the shorting out or overheating of any one of the sensors, the gate current of the SCR drops to a value below that necessary for conduction causing the relay to open and thereby disconnecting the electrical apparatus. Several embodiments are disclosed to cause the circuit to be inoperative while an overheated sensor cools to a predetermined safe temperature.

---

This invention relates to control circuits and more particularly to a circuit for detecting overheating in electrical apparatus and the like.

In the operation of electrical apparatus, it is often times desirable to have monitors to detect areas of overheating which are not visible to the eye or which may not be detected by other means. In such instances, it may be necessary to monitor more than one spot within the equipment, for example, in three phase motors and generators, it would be desirable to keep a constant monitor on each phase winding, or in nuclear reactors, it may be necessary to check in various spots to detect hot spots which may arise.

It is therefore one object of the invention to provide a control circuit for monitoring simultaneously a number of points within a piece of apparatus.

Another object is to provide a circuit which will detect temperature rises within a piece of apparatus.

Still another object of the present invention is to detect when the control circuit sensor fails so that it may be replaced.

Other objects and features of the invention may be more readily understood from the following detailed description and appended claims when read in conjunction with the accompanying drawings in which like referenece numerals designate like parts throughout the figures thereof, and in which:

Figure 1:
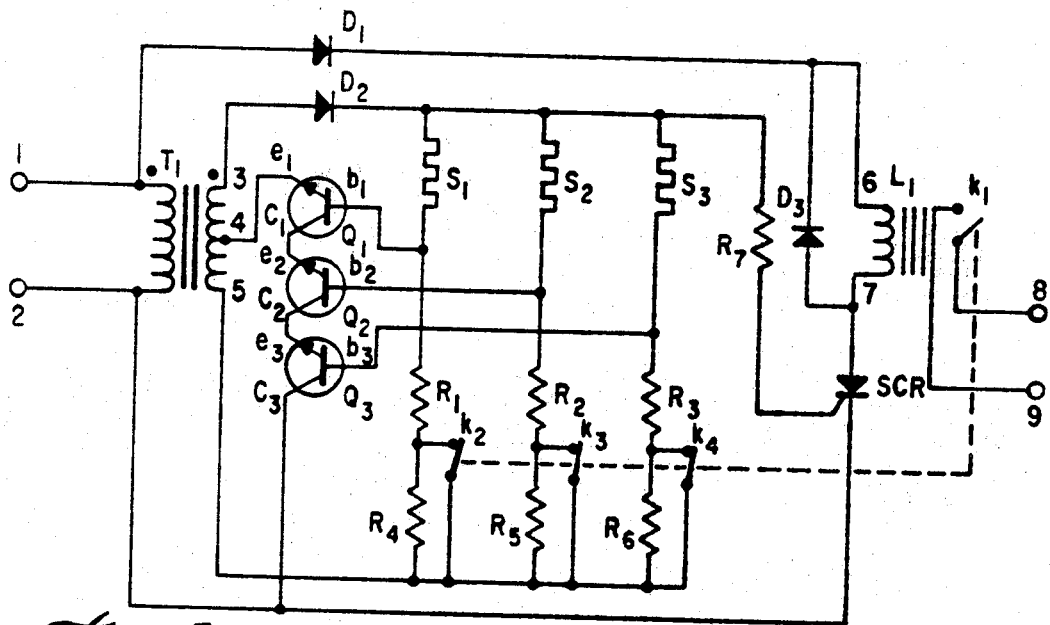
FIGURE 1 is a schematic diagram of one embodiment of the present invention.

Referring to the drawings, FIGURE 1 is a circuit diagram of one embodiment of the invention. Shown is a controlled circuit having three sensory elements, $S_1$, $S_2$, and $S_3$ which may be placed, for example, in the windings of a three phase generator or in three different spots in a piece of equipment to be monitored. Sensors $S_1$, $S_2$, and $S_3$ are heat sensitive resistors having a positive coefficient of resistance so that the resistance of each device will increase with an increase in temperature. Each sensor is connected in series with two resistors across the secondary winding of transformer $T_1$. The common point between each sensor and the resistor connected thereto is connected to the base of a transistor. For example, $S_1$ is connected to resistor $R_1$ and the common point is connected to the base $b_1$ of transistor $Q_1$. In a similar fashion, the base $b_2$ of transistor $Q_2$ is connected to the common point between sensor $S_2$ and resistor $R_2$, and the base $b_3$ of transistor $Q_3$ is connected to the common point between sensor $S_3$ and resistor $R_3$. These sensor-resistor circuits are used to bias the transistors in a conducting state. Bias voltage is derived from the secondary or transformer $T_1$ and rectified to produce a pulsating DC voltage by diode $D_2$. Each of the resistors $R_1$, $R_2$, and $R_3$ have a second resistor connected thereto, $R_4$, $R_5$, and $R_6$, respectively. Resistors $R_4$, $R_5$, and $R_6$ have contacts $K_2$, $K_3$ and $K_4$, respectively, connected across them. The function of the contacts $K_2$, $K_3$, and $K_4$ and resistors $R_4$, $R_5$, and $R_6$ will be explained in more detail below.

Figure 3:
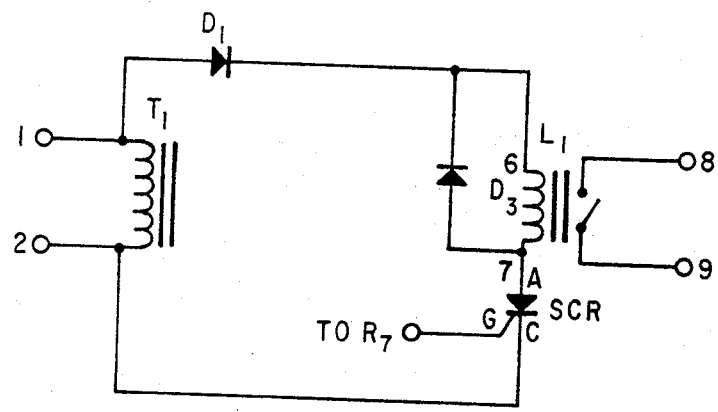
FIGURE 3 is a simplified circuit of a portion of the circuit in FIGURE 1.

The purpose of the sensor-transistor resistor circuit described above is to control the gate current to the semiconductor control rectifier (SCR). The SCR, when conducting, permits current to flow through relay $L_1$ closing contact $K_1$. The current through relay $L_1$ is supplied by the voltage across the primary winding of transformer $T_1$ which is an AC voltage. As long as the sensor circuit is supplying gate current to the SCR, current will flow from terminal 1 to rectifier $D_1$ through the relay $L_1$, the SCR and back to terminal 2 of transformer $T_1$. To explain the operation in more detail, the circuit in FIGURE 1 has been broken down into two circuits illustrated in FIGURES 3 and 4. FIGURE 3 is the circuit in which current flows to operate relay $L_1$, and FIGURE 4 has been simplified by including only one sensor circuit. Each of the three sensor circuits operate in the same manner, therefore, only one circuit is needed to explain the operation of controlling the gate current to gate G of the SCR.

Figure 4:
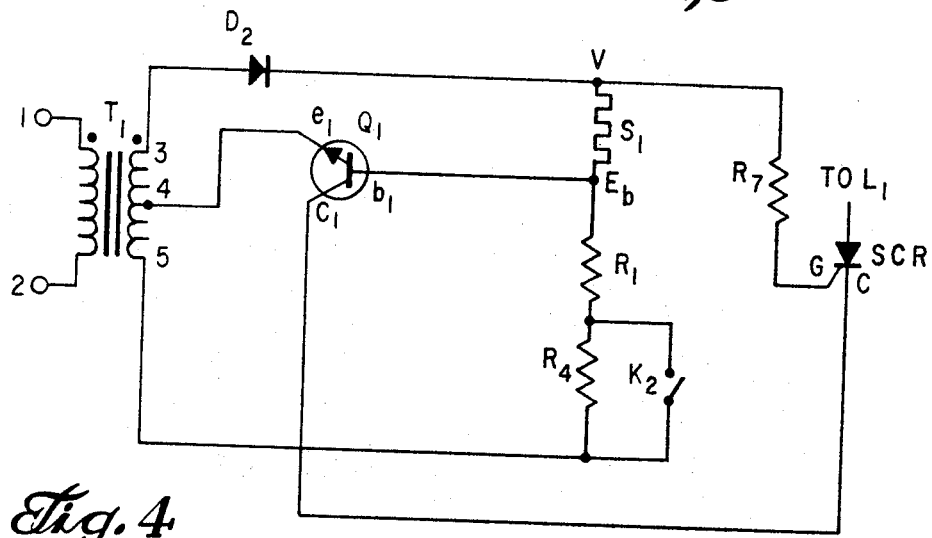
FIGURE 4 is a simplified circuit of another portion of the circuit in FIGURE 1.

Reference is now made to the circuits shown in FIGURES 3 and 4. When an AC voltage is applied to terminals 1 and 2 of transformer $T_1$, a voltage will be applied to relay $L_1$ on each positive half cycle of the AC signal as long as current is being supplied to gate G of the SCR. On each positive half cycle, the current flows from the terminal 1 of transformer $T_1$ and through diode $D_1$, relay $L_1$, the SCR and around to terminal 2 of transformer $T_1$. On the negative cycle of the applied AC signal, the current would flow in the reverse direction if not for diode $D_1$ and the SCR being unilateral, permitting current flow only during the positive half cycle. Normally, during the negative half cycle of the applied signal, relay $L_1$ would open up since there is no current flowing therethrough. However, by placing a diode $D_3$ across the relay, current caused by the collapsing field built up within the coil of the relay will circulate holding relay $L_1$ closed until the next positive half cycle. Contact $K_1$ on relay $L_1$ may be used to close a circuit to supply power to a motor or other apparatus. Therefore, as long as the SCR is getting sufficient gate current to maintain conduction therethrough on each positive half cycle of the applied AC voltage, relay $L_1$ will keep contact $K_1$ closed applying power to any equipment attached to terminals 8 and 9.

The current to the SCR is controlled by the circuits shown in simplified form in FIGURE 4. The resistance values of the bias circuit comprising sensor resistor $S_1$ and resistors $R_1$ and $R_4$ are so selected that when the temperature environment of $S_1$ is within a selected range, bias will be applied to base $b_1$ of transistor $Q_1$ permitting the transistor to be in a conducting state. During this time current will flow from the secondary of $T_1$ during each positive half cycle of the transformed applied AC voltage from terminal 3 to rectifier $D_2$, resistor $R_7$ to gate G of the SCR, out the cathode of the SCR, through collector $C_1$, of transistor $Q_1$ to the emitter $E_1$ and to the center tap 4 on the secondary winding of $T_1$. When the temperature environment of $S_1$ increases, the resistance of $S_1$ will increase. Thus, when the temperature exceeds a certain value, $S_1$ will increase in resistance to a value which is large in comparison with the value of $R_1$, reducing the bias to transistor $Q_1$ to a value at which transistor $Q_1$ will no longer conduct. When this occurs, the current to the SCR through gate G will decrease to a point below that which is necessary for the SCR to conduct. At this time, current will no longer flow through the SCR and through relay $L_1$. When there ceases to be current through $L_1$, contact $K_1$ will open, opening the circuit connected to terminals 8 and 9 and turning off any equipment which may be attached thereto.

Contact $K_2$ on relay $L_1$ is connected across resistor $R_4$. Contact $K_2$ is closed when relay $L_1$ is inoperative, therefore, shorting resistor $R_4$ out. When resistor $R_4$ is shorted out, the voltage on base $b_1$ of transistor $Q_1$ is lower than it would be if contact $K_2$ were open. This causes the circuit to be inoperative until the temperature is lowered and the resistance of $S_1$ is decreased to a value lower than it would normally have to be to provide a bias to base $b_1$ to permit transistor $Q_1$ to conduct. When the resistance of $S_1$ has decreased to a much lower value, and the transistor $Q_1$ is again biased in a conducting state, then current will be applied to gate G of the SCR so that the SCR will conduct and relay $L_1$ may be actuated. As soon as relay $L_1$ operates, contact $K_2$ will open placing $R_4$ again in series with $R_1$ increasing the voltage at the base of $b_1$, therefore placing the sensor circuit in a normal operative condition.

To explain the bias of the transistor $Q_1$ in more detail, it is only necessary to look at the series circuit comprised of $S_1$, $R_1$, $R_4$ and the voltage at the point V. When contact $K_2$ is open, the voltage at $E_{b_1}$ is equivalent to:

$$V \cdot \frac{R_1 + R_5}{R_1 + R_1 + R_4}$$

therefore, it may be observed that as $S_1$ increases, the quantity $E_{b_1}$ will decrease, thereby lowering the voltage on the base of $Q_1$. When contact $K_2$ is closed, resistor $R_4$ is shorted out of the circuit, therefore, the voltage $E_{b_1}$ is equal to $$V \cdot \frac{R_1}{S_1 + S_1}$$

From this relationship it may be observed that as the resistive value of $S_1$ decreases the voltage at $E_{b_1}$ increases and when reaching a certain level turns the transistor $Q_1$ on.

Another feature of the circuit, is that in the event $S_1$ is shorted out, the gate current to gate G of the SCR drops to a value below that necessary for the SCR to conduct and relay $L_1$ is again opened up thereby opening contact $K_1$. This occurs for the following reason: when the sensor $S_1$ is shorted, the impedance in the circuit formed by the transformer secondary beginning with terminal 3 through diode $D_2$ to base $b_1$ through the emitter $E_1$ back to center tap 4 is made very low compared to that in the impedance in the secondary winding of the transformer between the terminals 3 and 4, therefore, the voltage applied to the gate of the SCR falls below the value necessary for the SCR to conduct and the relay opens, opening contact $K_1$ and closing contact $K_2$. The reason that the voltage at V does drop is that with the shorting of $S_1$, the current increases to the point where the internal impedance of the winding between terminals 3 and 4 drops the voltage across the internal impedance of the winding, decreasing the voltage at V. When the voltage at V is decreased, the current at the gate is decreased to a point below that necessary to permit the SCR to conduct.

In FIGURE 1, the control circuit of FIGURE 4 is repeated to permit the use of more than one sensor. Each of the transistors $Q_1$, $Q_2$, and $Q_3$ are connected in series so that if any one of the three transistors is biased to a point where it no longer conducts, then the current to the gate G of the SCR will decrease below that necessary for the SCR to conduct and relay $L_1$ will be opened. In this manner, if any of the heat sensors in any location either is shorted or subjected to a temperature in excess of the desired temperature limit, then the circuit connected to terminals 8 and 9 will be turned off. Even though three sensors have been shown in FIGURE 1, any number of sensor circuits may be used to control any number of points within an apparatus.

Figure 2:
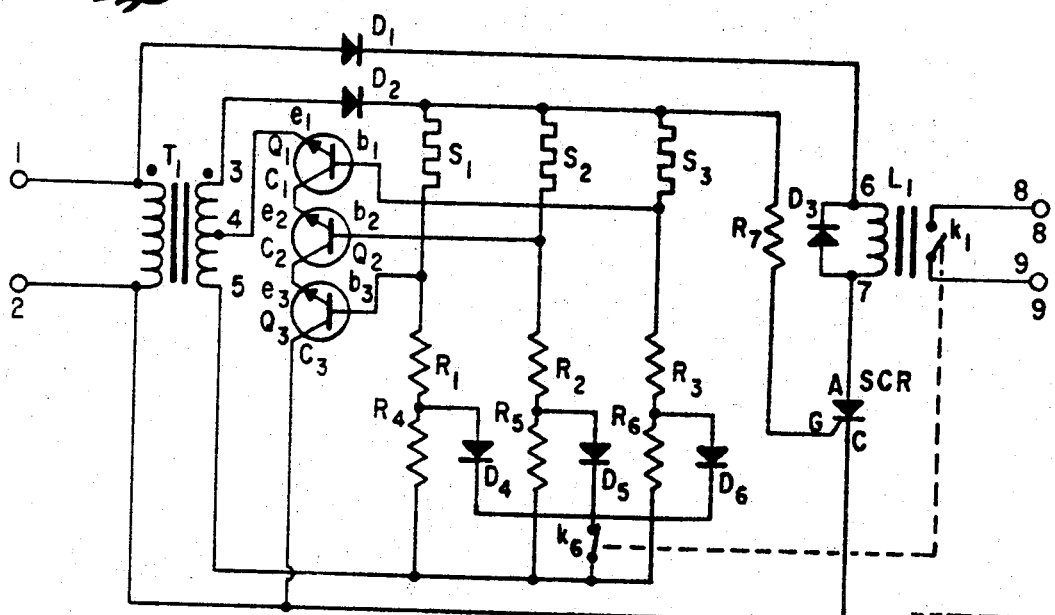
FIGURE 2 is a schematic diagram of a second embodiment of the present invention.

In FIGURE 1 each sensor circuit has a relay contact across one of the resistors for one of the reasons explained above. However, two of the contacts may be eliminated as illustrated in FIGURE 2 and replaced with a single contact and three diodes. Each of the resistors $R_4$, $R_5$, and $R_6$ have a diode $D_4$, $D_5$, and $D_6$ connected thereto, and each of the diodes have a common lead connected to the other. This common lead is connected to one terminal of contact $K_6$ which when closed is connected to the wire connected connected to terminal 5 of transformer $T_1$. The three diodes and contact $K_6$ perform the same function as the three contacts shown in FIGURE 1. The diodes are used to isolate each of the sensor bias circuits from the other. Otherwise, the operation of the circuit shown in FIGURE 2 is the same as that shown in FIGURE 1.

Although the present invention has been shown and illustrated in terms of specific preferred embodiments, it will be apparent that changes and modifications are possible without departing from the spirit and scope of the invention as defined in the appended claims.

What is claimed is:
1. A protection circuit for electrical apparatus having condition sensors and being fail safe against failure of any of the sensors comprising:
   an A.C. voltage source comprising primary and secondary windings, the secondary winding having an intermediate potential tap;
   a plurality of voltage dividers connected in parallel across said secondary winding, each divider including a condition-responsive impedance element serially connected with a reference impedance element and having a respective electrical junction between the condition-responsive and reference impedance elements thereof;
   a relay for controlling the flow of electric power to a load device, said relay having a control winding connected across the primary winding;
   a silicon-controlled rectifier, said control winding connected to the anode-cathode circuit of said silicon-controlled rectifier, the gate of said silicon-controlled rectifier connected intermediate said secondary winding and said condition-responsive impedance elements;
   said relay including first contacts which are closed when said silicon-controlled rectifier is conducting, permitting flow of electric power to said load device; and
   a plurality of transistors, the base terminals of each transistor connected to a respective one of said electrical junctions between the condition-responsive and reference impedance elements, the emitter-collector circuits of said transistors being serially connected, the emitter of the first of said plurality of transistors connected to said intermediate tap, the collector of the last of said plurality of transistors connected to the cathode of said silicon-controlled rectifier.

2. Apparatus according to claim 1 wherein a resistor element is serially connected in each of such voltage dividers between each respective reference impedance element and said secondary winding and said relay further includes second contacts interconnecting said secondary winding and the junction between each said resistor element and the respective reference impedance element, the second contacts being in an open position when said first contacts are in a closed position.

3. Apparatus according to claim 2 in which:
each voltage divider has a diode interconnecting the junction between the respective resistor element and reference impedance element and the said second contacts.

4. Apparatus according to claim 1 further including a diode connected between the control winding and the primary winding for blocking current flow therethrough in A.C. half-cycles of one polarity;
a holding diode connected across said control winding; and
a diode connected between said secondary winding and said condition-responsive impedance elements for blocking current flow therethrough on A.C. half-cycles of one polarity.

5. A protection circuit for sensing a temperature having a first and a second range and for producing an output signal indicative of whether the sensed temperature is the first or second range and having a fail-safe feature against failure of the sensing means comprising:
a power source, an electromagnetic relay means having a first and a second contact position for indicating by its contact position whether the sensed temperature is of the first or second range and whether the sensing means is operating normally or has failed;
a gated semiconductor device, the conductive non-conductive state of said device controlling the flow of current from said power source to said electromagnetic relay means for controlling the contact position of said relay means;
a positive coefficient thermistor means for sensing said temperature and for controlling the quantity of current flow to the gate terminal of said gated semiconductor device, causing said gate current flow to be directly proportioned to the resistance of said thermistor means, said thermistor means causing said gate current to be insufficient to gate said gated semiconductor device to the conductive state when said thermistor means resistance drops below a value indicative of a short circuit condition in said thermistor means; and
transistor means for blocking gate current flow to said gated semiconductor device and causing said device to be non-conductive when the resistance of said thermistor means is indicative of an open circuit condition in said thermistor means or of a temperature in said second temperature range.

6. Apparatus according to claim 5 in which said thermistor means include a plurality of thermistors and said transistor means includes a plurality of transistors; each thermistor is connected to the base of a respective transistor, said thermistors are connected in parallel and the emitter-collector circuits of said transistors are connected in series.

7. Apparatus according to claim 6 in which each thermistor is serially connected to a voltage dividing resistor means.

8. Apparatus according to claim 7 in which each voltage dividing resistor means includes first and second serially connected resistors, and said relay including additional contacts which are adapted to short out said second resistors when said relay is in the second contact position.

9. Apparatus according to claim 8 in which each voltage dividing resistor means includes a diode interconnecting the junctions below the first and second resistors and said additional contacts.

10. A protection circuit for sensing temperatures having a first and second range and for producing an output signal indicative of whether the sensed temperature is in the first or second range and having a fail-safe feature against failure of the temperature sensing means, comprising:
a first power source means for producing electrical power, an electromagnetic relay in series with said first power source, said relay having a first and a second contact position indicative of whether the sensed temperature is in said first or said second range and of the normal or failed state of the sensing means, and said relay contact position being determined by the presence or absence of current flowing through said relay from said first power source means;
a second power source means for producing electrical power, a gated semiconductor device in series with said first power source means and said electromagnetic relay, the conductive non-conductive state of said gated semiconductor device controlling the flow of current from said power source means to said relay, said gated semiconductor device having its gate terminal connected in series with said second power source means, a positive thermal coefficient thermistor connected in parallel to said gate terminal and in series with said second power source means, said thermistor having a resistance directly proportioned to the temperature being sensed, the voltage drop across said thermistor determining the gate voltage and gate current to said gate terminal; and
a transistor having its base terminal connected in series with said thermistor, its collector terminal connected in series with said second power source means, and its emitter terminal connected in series with said first power source means, the conductive non-conductive state of said transistor being dependent upon the resistance of said thermistor and said conductive non-conductive state enabling and blocking gate current flow to said gate terminal,
whereby when the resistance of said thermistor is a value indicative of a sensed temperature in said first range sufficient gate current is caused to flow to said gated semiconductor device to cause it to be conductive and causing said electromagnetic relay to be in said first condition,
when the resistance of said thermistor is above a value indicative of a sensed temperature in said second range or of an open circuit condition in said thermistor, said transistor blocks gate current flow to said gated semiconductor device and said relay is caused to be in said second contact position, and when said resistance is below a value indicative of a short circuit condition in said thermistor, gate current is caused to flow which is insufficient to cause said gated device to be conductive and said relay is caused to be in said second contact position.

11. Apparatus according to claim 10 in which the first and second power source means comprises an A.C. power source and a transformer with primary and secondary windings.

References Cited

UNITED STATES PATENTS 3,032,690 5/1962 Elliot _____ 317—41
3,262,014 7/1966 Conner _____ 317—13
3,329,869 7/1967 Obenhaus _____ 317—41 X LEE T. HIX, *Primary Examiner.*

J. D. TRAMMELL, *Assistant Examiner.*